United States Patent
Huang et al.

(10) Patent No.: US 7,667,447 B2
(45) Date of Patent: Feb. 23, 2010

(54) LOAD ADAPTIVE POWER DELIVERY

(75) Inventors: Lilly Huang, Portland, OR (US); Wayne Proefrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 11/321,329

(22) Filed: Dec. 28, 2005

(65) Prior Publication Data

US 2007/0145962 A1 Jun. 28, 2007

(51) Int. Cl.
*G05F 1/40* (2006.01)
(52) U.S. Cl. ........................ 323/285; 323/284
(58) Field of Classification Search ......... 323/282–285, 323/351
See application file for complete search history.

(56) References Cited

U.S. PATENT DOCUMENTS

| | | | |
|---|---|---|---|
| 5,945,817 A | 8/1999 | Nguyen | |
| 6,392,362 B1 * | 5/2002 | Ito | ................. 315/224 |
| 6,693,412 B2 | 2/2004 | Ruan et al. | |
| 6,933,711 B2 * | 8/2005 | Sutardja et al. | ............. 323/283 |
| 7,049,802 B2 | 5/2006 | Ruan et al. | |
| 7,368,897 B2 | 5/2008 | Qahouq et al. | |
| 7,484,108 B2 | 1/2009 | Diefenbaugh et al. | |
| 7,519,839 B2 | 4/2009 | Diefenbaugh et al. | |
| 7,541,693 B2 | 6/2009 | Huang et al. | |
| 2009/0167270 A1 | 7/2009 | Lam et al. | |

* cited by examiner

*Primary Examiner*—Jessica Han
(74) *Attorney, Agent, or Firm*—Kacvinsky LLC

(57) ABSTRACT

Embodiments disclosed herein include a power monitor and controller which are used to control the operation of a voltage regulator depending on an operating mode or state of a load device, such as a hard disk drive. By controlling the voltage regulator in this manner, voltage regulator efficiency may be improved for any load condition, thus reducing power losses in the system.

20 Claims, 5 Drawing Sheets

LOAD ADAPTIVE POWER DELIVERY

BACKGROUND

1. Field

Embodiments of the present invention relate to the field of power delivery for computing devices and more specifically to adaptive power delivery to control and manage power efficiency for one or more devices in a system.

2. Discussion of Related Art

A typical example of a power delivery network is shown in FIG. 1. A hard disk drive (106) is directly powered by a voltage regulator (104). The voltage regulator converts the system supply voltage (102) to the appropriate voltage level (Vcc) required by the hard disk drive under its entire load current range (Icc).

Power consumption of a hard drive varies from time to time during its operation. Table 1, below, illustrates the power consumed during various stages of operation by a 1.8 inch Toshiba® MK2004 hard disk drive requiring a supply voltage of 3.3V±5%:

TABLE 1

Power consumption of a hard disk drive

| Operating Mode | Average Power |
| --- | --- |
| Start | 1.2 W |
| Seek | 1.4 W |
| Read/Write | 1.4 W |
| Active Idle | 0.6 W |
| Low Power Idle | 0.4 W |
| Standby | 0.2 W |
| Sleep | 0.08 W |

Even though the drive operates at a single fixed voltage level, its load power or current changes by approximately 2× from the start mode to active idle. There is nearly a 10× change in power consumption from active idle mode to sleep mode.

A typical voltage regulator (104) may be designed to optimize its performance at a single maximum load point, Icc_MAX. Thus, for all other operating loads, the performance of the voltage regulator may be less efficient. Typically the efficiency of the voltage regulator is 30-50% less at a light load (e.g. less than 10% of Icc_MAX).

FIG. 2 is a graph (200) illustrating the power efficiency of an example voltage regulator across a range of load currents. The example voltage regulator is most efficient at the maximum load current, Icc_MAX, and is less efficient at loads less than Icc_MAX. Region 202 indicates a region of lower load current operation, such as in the active idle, low power idle, standby, or sleep modes, where power efficiency may be lower than the maximum efficiency. Thus, in some modes there may be power loss caused by the inefficiency of the VR, which can lead to shorter battery life in a battery powered system.

BRIEF DESCRIPTION OF THE DRAWINGS

An understanding of embodiments of the present invention can be obtained from the following detailed description in conjunction with the following drawings, in which.

DETAILED DESCRIPTION

A method, system, and apparatus to reduce voltage regulator power loss and increase power efficiency are described herein. In the following description, for purposes of explanation, numerous specific details are set forth in order to provide a thorough understanding of embodiments of the present invention. However, it will be apparent to one skilled in the art that these specific details are not required in order to practice embodiments of the present invention.

Embodiments disclosed herein include a power monitor and controller which are used to control the operation of a voltage regulator depending on an operating mode or state of a load device, or power consumption of the device. By controlling the voltage regulator in this manner, voltage regulator efficiency may be increased for any load condition, thus reducing power losses in the system.

Figure 1:
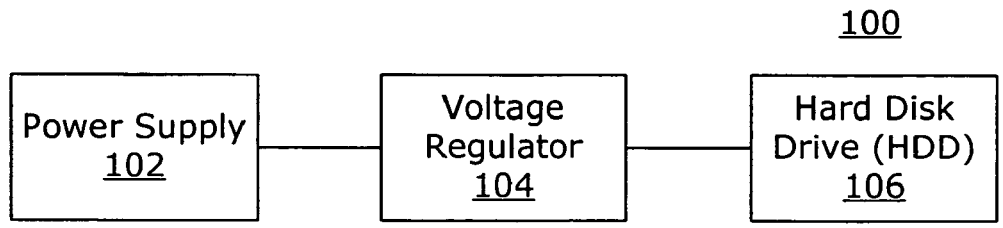
FIG. 1 is a block diagram illustrating a typical power delivery network.
Figure 2:
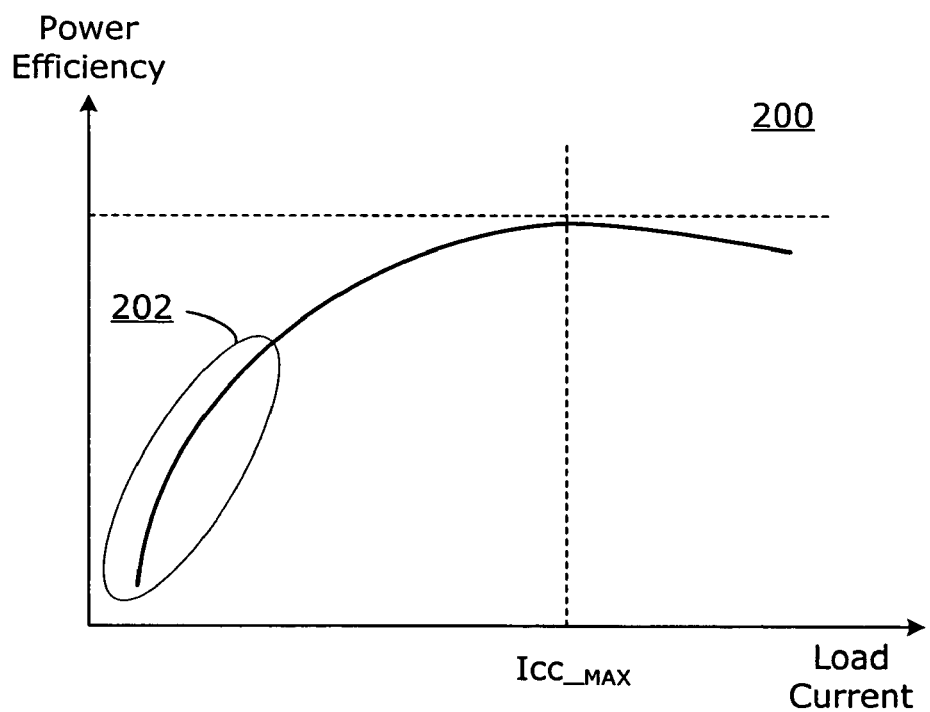
FIG. 2 is a graph which illustrates power efficiency versus load current for a typical power delivery network.
Figure 3:
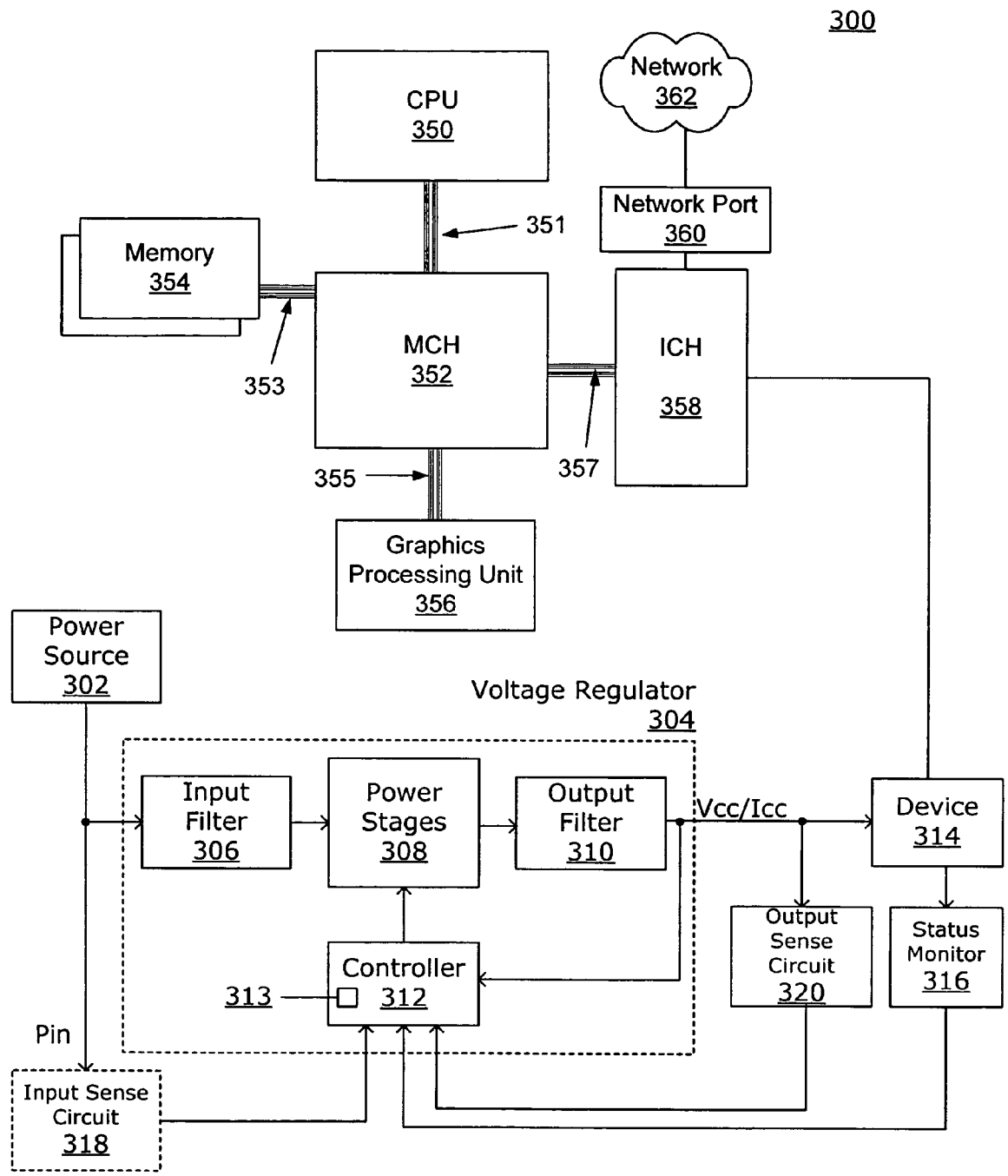
FIG. 3 is an illustration of a block diagram of a power delivery system according to some embodiments.

FIG. 3 illustrates a system (300) to adjust and control power delivery based at least in part on one or more of load demand and/or device power state according to some embodiments. The system (300) may include at least a processor or CPU (350), memory controller device (352), I/O controller device (358), and one or more memory devices (354). Note that in some embodiments, the memory controller device and/or the I/O controller device may be integrated into the CPU/processor.

The system may also include a network port or interface (360), and may be coupled to a wired or wireless network (362). The memory controller device (352) may be coupled to the CPU (350) by a bus or interconnect (351). The memory controller device (352) provides the CPU (350) with access to one or more memory devices (354), to which the memory controller device (352) is coupled by a memory bus or interconnect (353).

A graphics processing unit (356) may be coupled to the memory controller device via a bus or interconnect (355). An I/O controller hub (358) may be coupled to the memory controller device (352) by a bus or interconnect (357). The I/O controller hub (358) may be coupled to a network port (360), capable of connecting to a network (362). The I/O controller hub (358) may also be coupled to a storage device (314), which in some embodiments may be a hard disk drive. A battery or other power source (302) may provide power to the storage device (314), and may provide power to the entire system. For ease of understanding, the power delivery and voltage regulation scheme is shown only for a single device (314), and is not illustrated for the other components in the system.

Together, these components form a system (300) that is capable of supporting the execution of machine readable instructions by CPU (350), and the storage of data, including instructions, within memory devices (354). One or more components in the system may be powered by a power source (302) in conjunction with a voltage regulator (304), optional input sense circuit (318), output sense circuit (320) and device status monitor (316).

The voltage regulator (304) may include an input filter (306), power stages (308), and an output filter (310). Power is provided to the voltage regulator by a power source (302), which may be a battery or another type of power supply. The voltage regulator supplies an output voltage (Vcc) to the load device (314) at an output current (Icc).

The voltage regulator may also include a controller (312) to determine an operating mode for the voltage regulator. The controller may receive the output voltage and current of the voltage regulator (Vcc, Icc) from an output sense circuit (320). In some embodiments, the controller may also receive an input power, $P_{in}$, from an input sense circuit (318). The controller (312) may also receive load information from a device status monitor (316), which is coupled to a load device (314). In some embodiments, the load device may be any device having a variable load. For example, the device may be, but is not limited to, a hard disk drive, an optical drive, a display, a processor or other electronic component, or a system.

The device status monitor (316) may store information related to the operation and/or power consumption of the device (314). For example, the device status monitor information may include the current operational mode or power state of the device, the upper and lower boundaries of the device's power consumption, and the estimated time period the device is expected to stay in its present state. The device status monitor may monitor other device properties as well.

In some embodiments, the device sense monitor or monitors (316) may be implemented as a register or set of registers, or as an EPROM. The information stored by the device sense monitor may be stored in the form of a static look-up table. In other embodiments, the information stored by the device status monitor may be updated dynamically, as the system runs. Furthermore, the controller (312) may dynamically monitor/sense the power input (318) and output (320) to determine the best or optimal operational mode based on power efficiency using multiple sense monitors (input and output). In this case, a device status monitor may not be required.

The controller may receive information regarding the device's operational status and/or power consumption from the device status monitor. This information may include, but is not limited to, the current operational mode or power state of the device, the upper and lower boundaries of the device's power consumption, and/or the estimated time period the device is expected to stay in its present state. The controller may use this information in conjunction with the actual sensed Vcc/Icc to generate one or more control signals to control the operation of the power stage of the voltage regulator. In some embodiments, the controller may include a timer (313) to adjust the mode of operation of the voltage regulator based upon the estimated time period the device is expected to stay in its present state.

Dynamically adjusting the operating mode of the voltage regulator based on the power requirements of the device may allow the voltage regulator to achieve increased efficiency across multiple load conditions.

Figure 4:
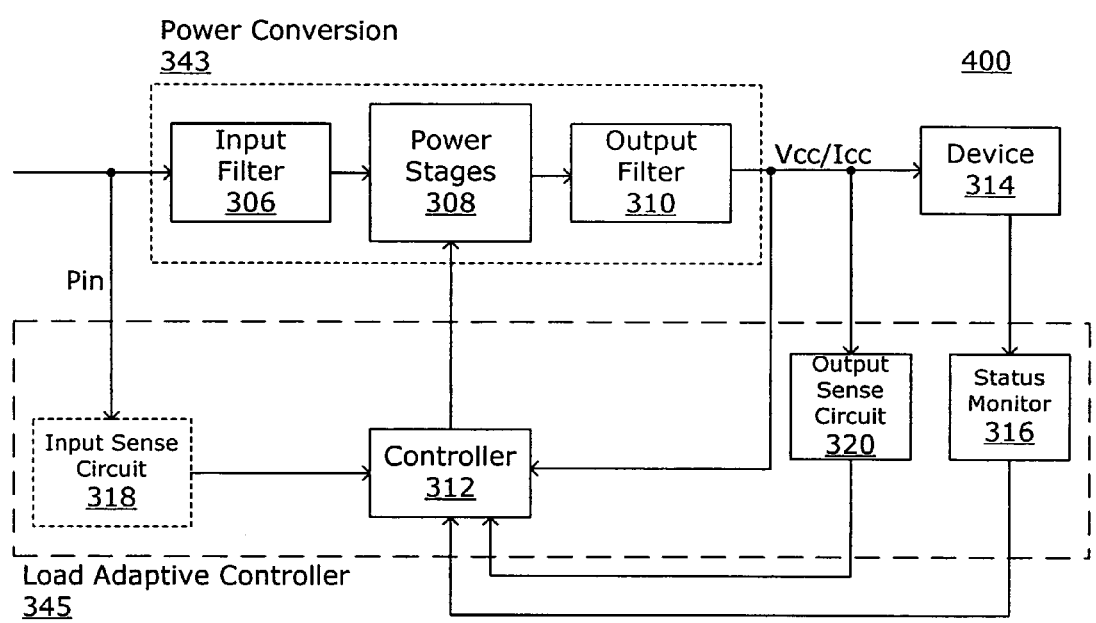
FIG. 4 is an illustration of a block diagram of a power delivery system according to some embodiments.

In some embodiments, such as shown in FIG. 3, the controller (312) may be part of the voltage regulator. FIG. 4 illustrates another embodiment, wherein the controller (312) may be separate from the power conversion circuitry (343).

The controller (312) may be a part of a load adaptive controller (345), which may include an input sense circuit (318), output sense circuit (320), and a status monitor (316). In some embodiments, the controller (312) and/or the load adaptive controller (345) may be an application specific integrated circuit (ASIC). The controller (312) and/or load adaptive controller (345) may further be integrated with another component, such as a chipset or processor, or may be integrated with the powered device (314).

Similarly, the device status monitor (316) may be a discrete component, such as an ASIC, or may be integrated into another component such as a chipset. In some embodiments, the device status monitor (316) may be integrated into the same component as the controller (312), such as in a load adaptive controller (345).

Figure 5:
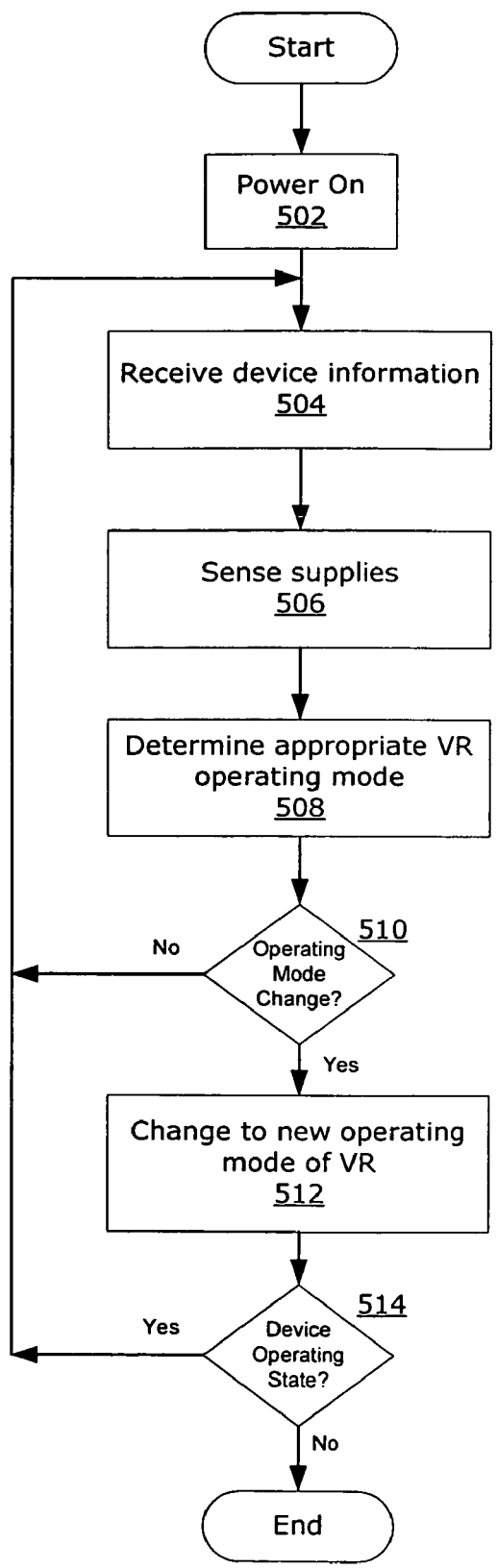
FIG. 5 is a flow diagram illustrating a method according to some embodiments.

FIG. 5 is a flowchart illustrating a load adaptive power delivery approach according to one embodiment. Upon system power up (502), a voltage regulator may initially be in a full power mode, due to the uncertain behavior of the load device at power up. The controller may then receive device information from the device status monitor (504), and may sense the voltage regulator input and/or output supplies ($P_{in}$ Vcc, Icc) (506).

The controller may use the device information in conjunction with the VR supply information to determine an appropriate operating mode for the voltage regulator (508). The operational mode of the voltage regulator may be chosen to improve power efficiency based on load demand considerations indicated by the device status monitor.

If the voltage regulator is not operating in the appropriate mode, then an operating mode change may be necessary (510). If the voltage regulator is operating in the appropriate mode, the controller may continue to monitor the device information (504) and supplies (506) to determine if/when an operating mode change is appropriate (508).

In some embodiments, the controller may include predefined operational mode adjustment sequences that correspond to known device behaviors. For example, the behavior and power requirements of a hard disk drive on wake up are generally known and understood. Thus, when the controller detects that the hard disk drive has entered a wake up state, the controller may use a predefined wake up sequence to control the voltage regulator during the hard drive wake up state. The use of predefined operational mode sequences which correspond to known device states may reduce the complexity of the controller design and increase efficiency.

After the controller has determined a proper operational mode for the voltage regulator, it may then direct the voltage regulator to either remain in its current mode of operation, or transition up or down to an appropriate mode of operation (512). The controller may output a signal to the voltage regulator to change the VR operating mode, or may control the mode of operation of the voltage regulator in another manner.

There are a number of different modes of operation that a voltage regulator power stage may use in order to reduce its conduction and switching losses. For example, at a full or heavy load, the controller may indicate to the voltage regulator to operate at a fixed switching frequency. Below a certain load limit, the voltage regulator may be controlled to operate in a discontinuous conduction mode with a variable frequency. In another mode, the voltage regulator may intentionally turn off certain voltage regulator circuit components. For example, a synchronous switch in a buck converter may be shut down by the controller as the voltage regulator's output current approaches zero. There may be other operational modes that reduce power loss and increase efficiency as well.

The controller may continue to monitor the device status as long as the device is operational (514), changing the voltage regulator operating mode when appropriate (512).

Figure 6:
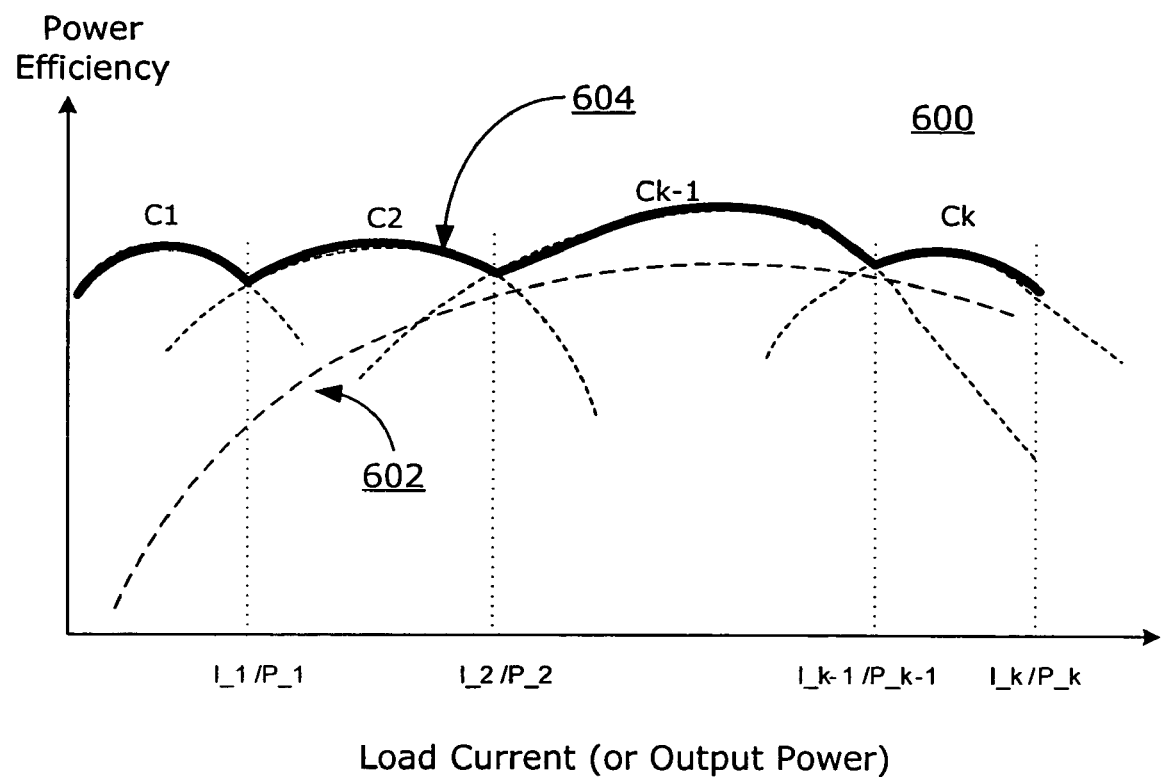
FIG. 6 is a graph illustrating power efficiency versus load current according to some embodiments.

FIG. 6 is a graph (600) which illustrates the results that may be achieved using embodiments of the load adaptive power delivery methods described herein. Line 602 indicates the efficiency of a voltage regulator using a conventional approach. The efficiency is optimized at a single maximum load point, and for all other operating loads, the performance of the voltage regulator may be less efficient.

Line 604 indicates an improved efficiency using a load adaptive power conversion scheme of one embodiment. When the device is operating at a first load, in the range of zero to $I\_1/P\_1$, the voltage regulator is controlled to operate in a first mode, thus giving an efficiency curve of C1. Similarly, in each subsequent load range, the controller may change the mode of the voltage regulator to give optimal efficiency curves C2, Ck–1, and Ck. In some embodiments, the load curve (604) may approach a substantially linear load curve.

Thus, a method, apparatus, and system for load adaptive power delivery are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. An apparatus comprising:
    a voltage regulator to supply an output voltage and an output current;
    a controller coupled to the voltage regulator to sense the output voltage and output current, to receive load information, and to indicate a mode of operation for the voltage regulator, the load information comprises an operational mode of a device and an estimated time period for which the device is expected to stay in the operational mode; and
    wherein the load information is received by the controller from a device monitor and the controller is to dynamically change an operating mode of the voltage regulator based on the load information.

2. The apparatus of claim 1, wherein the voltage regulator comprises an input filter, at least one power stage, and an output filter.

3. The apparatus of claim 1, further comprising a device monitor coupled to the controller, wherein the load information is received by the controller from the device monitor.

4. The apparatus of claim 3, wherein the load information comprises an operational mode of a device.

5. The apparatus of claim 4, wherein the load information further comprises an upper and lower limit of power consumption for the device and an estimated time period for which the device is expected to stay in the operational mode.

6. The apparatus of claim 1, wherein the mode of operation is determined in response to the load information, the output voltage, and the output current.

7. The apparatus of claim 1, wherein the mode of operation is a fixed switching frequency mode of operation.

8. The apparatus of claim 1, wherein the mode of operation is a discontinuous conduction mode with variable frequency mode of operation.

9. A system comprising:
    a battery;
    a voltage regulator coupled to the battery and coupled to a device;
    a device monitor coupled to the device; and
    a controller coupled to the device monitor and to the voltage regulator, the controller to receive data from the device monitor and to generate a control signal for the voltage regulator, the data comprises an operational mode of a device and an estimated time period for which the device is expected to stay in the operational mode, wherein the controller is to dynamically change an operating mode of the voltage regulator based on the data received from the device monitor.

10. The system of claim 9, wherein the device monitor stores an operational mode of the device, an upper and lower limit of power consumption for the device and an estimated time period for which the device is expected to stay in the operational mode.

11. The system of claim 10, wherein the device monitor comprises a register.

12. The system of claim 11, wherein the device monitor is to be updated dynamically.

13. The system of claim 9, wherein the voltage regulator is to change from a first mode of operation to a second mode of operation based on the control signal.

14. The system of claim 9, wherein the device is a device having a variable load.

15. The system of claim 14, wherein the device is a hard disk drive.

16. A method comprising:
    sensing an output of a voltage regulator;
    receiving device information from a device monitor, the device information comprises an operational mode of a device and an estimated time period for which the device is expected to stay in the operational mode;
    indicating a mode of operation for the voltage regulator, wherein the mode of operation is determined based upon the output of the voltage regulator and the device information; and
    dynamically changing an operating mode of the voltage regulator based on the device information.

17. The method of claim 16, wherein the device information includes information regarding the operational mode of a device, a power range of the device, and a projected runtime of the device.

18. The method of claim 16, wherein the mode of operation is a fixed switching frequency mode of operation.

19. The method of claim 16, wherein the mode of operation is a discontinuous conduction mode with variable frequency mode of operation.

20. The method of claim 16, further comprising detecting a known device behavior and determining the mode of operation using a predefined operational mode sequence.

* * * * *

UNITED STATES PATENT AND TRADEMARK OFFICE
CERTIFICATE OF CORRECTION

PATENT NO. : 7,667,447 B2  Page 1 of 1
APPLICATION NO. : 11/321329
DATED : February 23, 2010
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Fourth Day of January, 2011

David J. Kappos
*Director of the United States Patent and Trademark Office*